No. 650,973. Patented June 5, 1900.
G. H. HILL.
ELECTRICAL SYSTEM FOR WATER TIGHT DOORS.
(Application filed Dec. 23, 1899.)
(No Model.) 5 Sheets—Sheet 1.

Witnesses: Inventor,
George H. Hill
by Thomas Ewing, Jr.,
Attorney.

No. 650,973. Patented June 5, 1900.
G. H. HILL.
ELECTRICAL SYSTEM FOR WATER TIGHT DOORS.
(Application filed Dec. 23, 1899.)
(No Model.) 5 Sheets—Sheet 2.

Witnesses:
Samuel W. Balch
W. Russell Bill

Inventor,
George H. Hill,
By Thomas Ewing, Jr.,
Attorney.

No. 650,973. Patented June 5, 1900.
G. H. HILL.
ELECTRICAL SYSTEM FOR WATER TIGHT DOORS.
(Application filed Dec. 23, 1899.)
(No Model.) 5 Sheets—Sheet 3.

Witnesses: Inventor,
Samuel W. Balch George H. Hill,
by Thomas Ewing, Jr.
Attorney.

No. 650,973. Patented June 5, 1900.
G. H. HILL.
ELECTRICAL SYSTEM FOR WATER TIGHT DOORS.
(Application filed Dec. 23, 1899.)
(No Model.) 5 Sheets—Sheet 4.

Witnesses: Inventor,
George H. Hill,
by Thomas Ewing, Jr.,
Attorney.

THE NORRIS PETERS CO., PHOTO-LITHO., WASHINGTON, D. C.

No. 650,973. Patented June 5, 1900.
G. H. HILL.
ELECTRICAL SYSTEM FOR WATER TIGHT DOORS.
(Application filed Dec. 23, 1899.)

(No Model.) 5 Sheets—Sheet 5.

Witnesses: Inventor,
George H. Hill,
by Thomas Ewing Jr.,
Attorney.

UNITED STATES PATENT OFFICE.

GEORGE H. HILL, OF EAST ORANGE, NEW JERSEY, ASSIGNOR TO FRANCIS TIFFANY BOWLES, OF NEW YORK, N. Y.

ELECTRICAL SYSTEM FOR WATER-TIGHT DOORS.

SPECIFICATION forming part of Letters Patent No. 650,973, dated June 5, 1900.

Application filed December 23, 1899. Serial No. 741,356. (No model.)

*To all whom it may concern:*

Be it known that I, GEORGE HENRY HILL, a citizen of the United States of America, and a resident of East Orange, in the county of Essex and State of New Jersey, have invented certain new and useful Improvements in Electrical Systems for Water-Tight Doors, of which the following is a specification, for which provisional application for patent was filed in Great Britain the 14th day of November, 1899, No. 22,732, and application for patent was filed in France the 17th day of November, 1899, Serial No. 282,533, and in Germany the 16th day of November, 1899.

The invention is applicable to water-tight doors, fire-shutters, and other analogous structures. It is designed expressly for water-tight bulkhead-doors for ships and will for convenience be described with express reference thereto.

The general scheme is to provide a suitable water-tight door, electrical and manual means for operating it locally from both sides of the bulkhead, electrical means for operating the doors singly or in groups from a distant point, as from the bridge or engine-room or from several such points, and to provide means local to each doorway for taking control of any individual door from the operator at a distant point, so that any door may be operated individually, locally, and independently of the concurrent operation of the other doors of the set. As illustrated and described, the system is arranged so that the doors may be opened and closed by the local operating means, but are only operated to be closed by the means located at points distant from the doors. Provision is also made for giving a return-signal at each point where the distant operating means is located, so that the operator may know that the doors are closing properly.

The invention resides mainly in the electrical circuits through which the operation of the doors is controlled.

In the accompanying drawings, which form a part of this specification.

The construction and manner of operating each door locally will first be described, and then the means by which the doors can be operated from distant points will be described.

Figure 1:
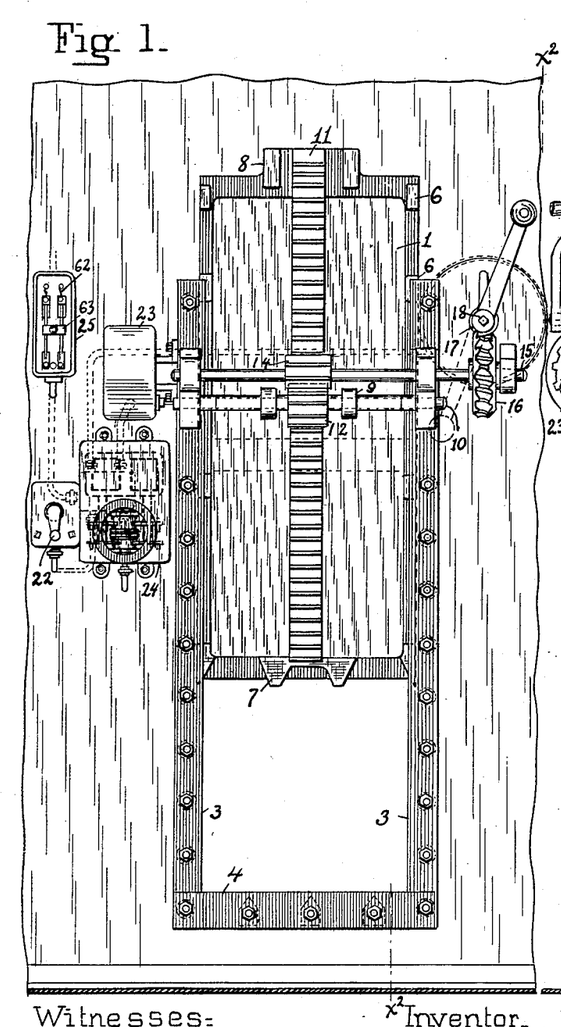
Figure 1 is a front elevation of the bulkhead with a door and apparatus for moving the door properly mounted thereon, together with the means for local control of the door.
Figure 2:
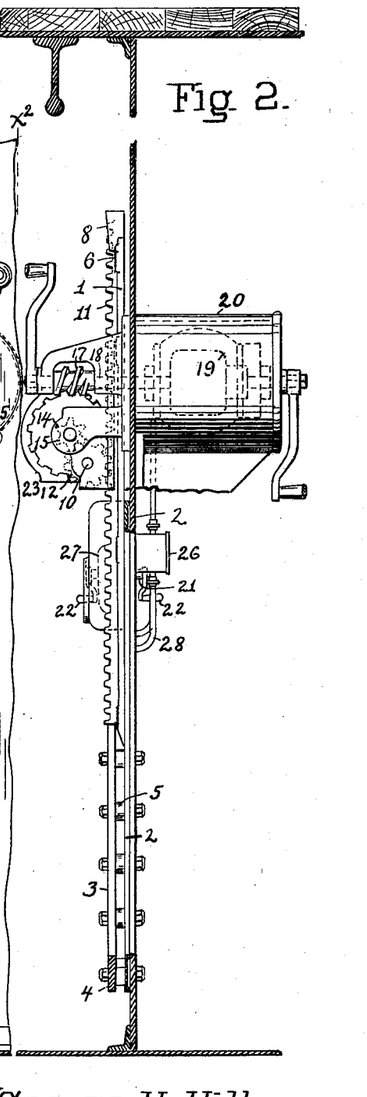
Fig. 2 is a section through the bulkhead on the line $x^2 x^2$ of Fig. 1.

In Figures 1 and 2 the door 1 is shown about half-way open. The door is shown as moving vertically; but it is equally possible to move it horizontally or at any desired angle. The door is intended to fit the edge of the doorway with a water-tight joint. To accomplish this, a frame 2, which will be called the "rear guide," is bolted to the bulkhead around the four edges of the doorway on one side of the bulkhead. This rear guide is fitted against the bulkhead with a water-tight joint. Its outer surface, against which the door is intended to bear, is a plane surface, and the surface around the rim of the door on all four edges, which contacts with this rear guide, is also a plane surface, so that if the door is forced back against this rear guide it will close the doorway with a water-tight joint. This rear guide is called a "framing" for the doorway. Instead the doorway might be planed around its edges. To force the door back against the framing, there are provided guides, which will be called the "front" guides. There are two vertical front guides 3 3 and also a front guide 4, which extends along the bottom of the doorway. These front guides are properly distanced from the rear guide by distancing-pieces 5, which are collars upon the bolts by which the guides are bolted to the bulkhead. The two vertical front guides 3 3 are inclined slightly from top to bottom with respect to the vertical portions of the rear guide, the front and rear guides being farther apart at the top than at the bottom. Along the vertical portions of the rim of the door next to the front guide are a number of raised bosses 6, intended to engage with the front vertical guides. These bosses have inclined surfaces which are parallel to the surfaces of the front vertical guides with which they engage, and the contacting surfaces of the bosses and these front vertical guides are planed to fit. By this construction the door is free to move up and down between the rear and front vertical guides; but when the door is closed these bosses 6 will bear against the front vertical guides 3 3, with the result that the door, because of the wedge shape of the contacting surfaces, will be forced back against the rear guide 2. This provides for forcing the door back along the vertical portions of its rim. To force the rim at the bottom of the door against the rear, guide-lugs 7 7 are attached at the bottom of the door, having wedge-surfaces which at their top when the door is closed engage the front guide 4, which is made separate from the vertical guides 3 3. They are pointed at their bottom, so as to cut through any material, as coal, which may be lodged on the door-sill. The front guide 4 at the bottom of the doorway is set at an angle to the rear guide 2, being closer to it above than below, (the distance thus increasing in the direction of motion of the door in closing,) so as to prevent the accumulation of material between the guides at the bottom of the doorway and to permit any material, such as coal, which may accumulate there to be pushed out from between the guides by the door in closing. To facilitate this, the distancing-pieces between the guides at the bottom of the doorway have knife-edges at their tops and leave clearance between the front guide and the rear guide or framing. To force the portion of the rim at the top of the door against the rear guide, there is provided at the top of the door and on either side of the middle vertical axis thereof wedge-surfaces 8 8, tapered from the top downward, which are intended to run underneath rollers 9 9, mounted on a shaft 10, extended across the top of the doorway, as will be more fully described hereinafter. Thus engaging wedge-surfaces are provided around the entire rim of the door and doorway to force the four edges of the door back against the rear guide and make a water-tight joint when the door is closed. Moreover, since the front guides are made of four separate parts they may be adjusted independently by means of distancing-pieces and liners or washers, so as to secure proper sealing of the door along each edge.

Along the middle vertical axis of the door a rack 11 is attached which engages with a pinion 12, mounted rigidly on the horizontal shaft 10. This shaft 10 is supported in brackets mounted on either side and near the top of the doorway. Attached to one end of the shaft 10 is a spindle 13, which operates the limit-switches, to be hereinafter described. In engagement with pinion 12 is another pinion 14, which is mounted upon a horizontal shaft 15, also supported in brackets on either side of the doorway, near the top. This second shaft 15 carries on one end a worm-wheel 16, which meshes with a worm or other gear 17 on the power-shaft 18. Beyond the worm-wheel 16, to the right, is an outboard-bearing.

The power-shaft 18 of the system is the axle of the armature 19 of an electric motor. The motor is mounted on the bulkhead, at right angles thereto, in a water-tight box 20, as shown in Fig. 2, its shaft passing through the bulkhead. Each end of the power-shaft is squared, so that a crank can be fitted upon it to operate the door up and down manually. As the power-shaft 18 extends through the bulkhead, the door can be thus operated manually from either side of the bulkhead. The spindle 21, on which is mounted the handle for operating the local-control switch, extends through the bulkhead, and a handle 22 is attached at each end, so that the door can be operated from either side of the bulkhead electrically as well as manually through the motor-shaft.

Conveniently disposed on the bulkhead near the doorway are water-tight boxes in which the various pieces of electrical apparatus necessary for operating the door electrically are mounted and protected. These are the box 23, which contains the limit-switches, the box 24, which contains the relays, the box 25, which contains a switch and fuses through which all of the system local to the door is connected to the mains A B, the junction-box 26, and the box 27, which contains the local-control switch. The wires are carried between the boxes through pipes 28. These various boxes and the parts inclosed in them are illustrated in detail in Figs. 3 to 13.

The electrical system for operating the doors locally will now be described.

Figure 18:
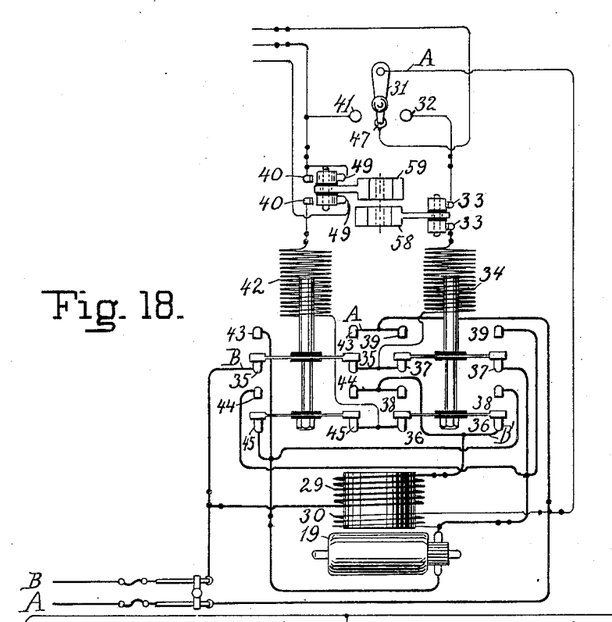
Fig. 18 is a diagrammatic representation, on an enlarged scale, showing the local means for operating the doors electrically and the connections to a distant point.

Fig. 18 illustrates the system for operating a single door locally by means of the local-control switch. This switch is shown as closed in its middle position upon a contact through which connection is had to the distant points of operation, the electrical system being shown with its various parts in the position in which it is when the door is closed. The motor has a compound field, one field-coil 29 being in series with the armature and the other, 30, in shunt with the armature. When the motor is operating to open the door, the series field alone is energized. When the motor is operating to close the door, both coils are connected in circuit. The purpose of the shunt-field is to preserve the field strength of the motor and cause it to move the door more slowly in closing than in opening and to give the motor more power, so that it may overcome any obstacle to closure of the door. When the local-control switch is thrown to the right hand in Fig. 18, contact is made from one of the mains A through one side of a double-pole knife-switch, whereby the whole system can be connected to and disconnected from the mains, thence through the switch-arm 31 and contact 32 of the local-control switch and the upper-limit switch 33, (which is closed except when the door is completely opened), thence through the coil of the up relay 34, and thence through contact 35 of the circuit-closer controlled by the down relay to the other main B. The up relay is thus energized. The two pairs of normally-closed contacts 36 and 37 controlled thereby are opened, and immediately afterward the two pairs of normally-open contacts 38 and 39 controlled thereby are closed. After this change is made the circuit through the local-control switch, the up relay, and the upper-limit switch is maintained, and the following circuits are also completed: from one of the mains A through contacts 39, through the armature 19 of the motor, through contacts 38, through the series coil 29 of the field-magnet, and thence to the other main B. The motor will then start to run and will continue until the local-control switch is opened, thus opening the circuits of the up relay, or the upper limit of travel of the door is reached, when the upper-limit switch will be thrown by means to be hereinafter described and will open the up-relay circuit, thereby causing the opening of the rest of the circuits. As soon as the door starts to open the lower-limit switch 40 is also closed.

If while the lower-limit switch is closed the local-control switch is thrown to the left, and thereby closed on the down side, a circuit will be established from one of the mains A through contacts 31 41 of the local-control switch, through the lower-limit switch 40 and down relay 42, through contacts 36 of the up relay, through the series field-coils 29 of the motor, and thence to the other main B. The down relay is then operated and the two normally-open pairs of contacts 43 and 44 controlled thereby are closed. The motor-circuits established thereby are as follows: from one of the mains A by one path through the shunt field-coils 30 and by another path through contacts 43 of down relay and thence through the motor-armature in the opposite direction to that before stated, thence through contacts 44 of the down relay, and thence through the series field-coils 29 of the motor in the same direction as that before stated to the other main. The door will then run until the local-control switch is opened or until the lower limit of travel of the door is reached, when the down relay is opened, and thereby the motor-circuits are opened, as above described. When the operator releases the handle of the local-control switch or the lower-limit switch is opened, the down-relay circuit is broken and the relay drops, breaking the operating motor-circuits theretofore established and opening the circuit through the shunt field-coil, but immediately closing a local circuit through the armature and the series field-coil, as follows: from the motor-armature 19 across contacts 37 and 35, through the series field-coil 29 in the same direction that current flows with the operative down circuits are closed, through contacts 36 and the lower normally-closed contacts 45 of the down relay to the other side of the motor-armature. So long as the motor continues to move (owing to the momentum of door, armature, &c.) current will be generated in the motor, which flows through its own series field-coil. This causes the motor to act as a dynamic brake and will quickly bring the moving parts of the system to a stop, at which time the current ceases to flow. The same action occurs also and the same circuits are made when the up-relay circuit is broken either at the operator's switch or the upper-limit switch. In this case the current generated by the motor flows through the series field in the opposite direction to that in which it flows when the operative up circuits are closed and the door is moving up, and as the time interval necessary to reverse the field is greater than that occupied by the moving system in coming to stop by gravity alone practically no current flows in this case.

The control of the doors from distant points will now be described.

Two general systems are shown for operating the doors from distant points, one (illustrated in Fig. 17,) for operating doors singly and another (illustrated in Fig. 19,) for operating all the doors of a group simultaneously, there being a return-signal for each door in both systems. These two systems are illustrated to show that the doors may be closed from the distant points individually or in small groups. In describing these systems the operator's switches at the distant points will be called "emergency-switches" to distinguish them from the local-control switches.

Figure 17:
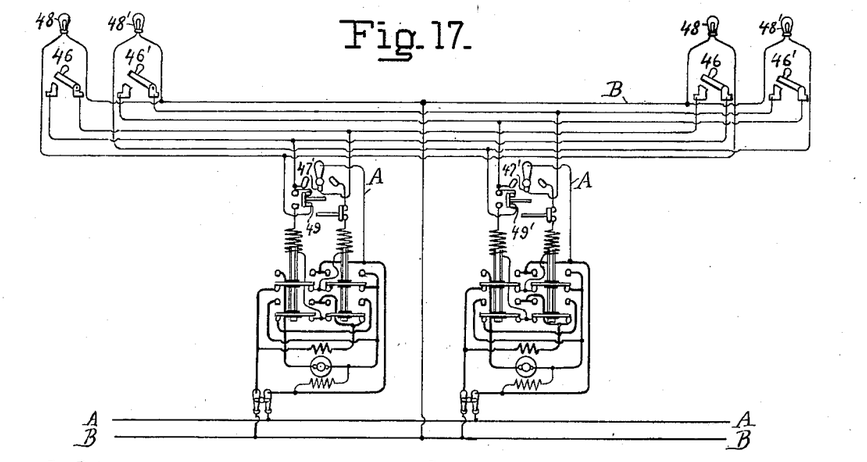
Fig. 17 is a diagrammatic representation of the system arranged for operating doors singly, showing the electrical means for operating the doors locally and from distant points, means for taking away control from the distant points, and the means for giving a return-signal at the distant points.

Fig. 17 shows two independent door-operating systems and emergency-switches 46 for operating the doors independently from two distant points. The circuits of the doors are not interrelated and any number of doors may be added, each having its appropriate system of circuits. The closure of an emergency-switch merely effects the closure of the down-relay circuit, already described, through the middle contact 47 of the local-control switch for the same door. It is therefore impossible to operate a door from an emergency-switch unless the local-control switch for that door is in middle position, and any person at a door wishing to operate it himself and take all control away from the distant points of operation can prevent its operation from an emergency-switch and assume entire control of the door by opening the middle contact of the local-control switch. This can be done for each of the doors individually in all positions of the doors and without interfering with the operation from the emergency-switches of all other doors the local control-switches of which are closed upon the contacts 47.

In order that upon closure of an emergency-switch the operator may know the operation of each of the doors individually and that the system is in proper working order, a signal-lamp 48 for each door system is provided at each emergency-switch, which lights when the lower-limit switch is operated on closure of the particular door corresponding to the particular signal-lamp provided for that door. It remains lighted until the emergency-switch is opened and can be relighted upon closure of an emergency-switch for inspection. This is effected through signal-contacts 49, which are provided on the lower-limit switch and are operated by the shaft which operates the door. These signal-contacts are opened when the relay-contacts 40 of the lower-limit switch are closed upon opening of the door and are closed when these relay-contacts are opened upon the closure of the door. The circuit through the lamp is as follows: from one of the mains A through contacts 31 47 of the local-control switch, thence through the emergency-switch 46, thence through signal-contacts 49 of the lower-limit switch, and thence through the signal-lamp 48 to the main B. In this system the signal-lamp is lighted when the door closes whether the door is being operated from the emergency-switch or the local-control switch.

Figure 19:
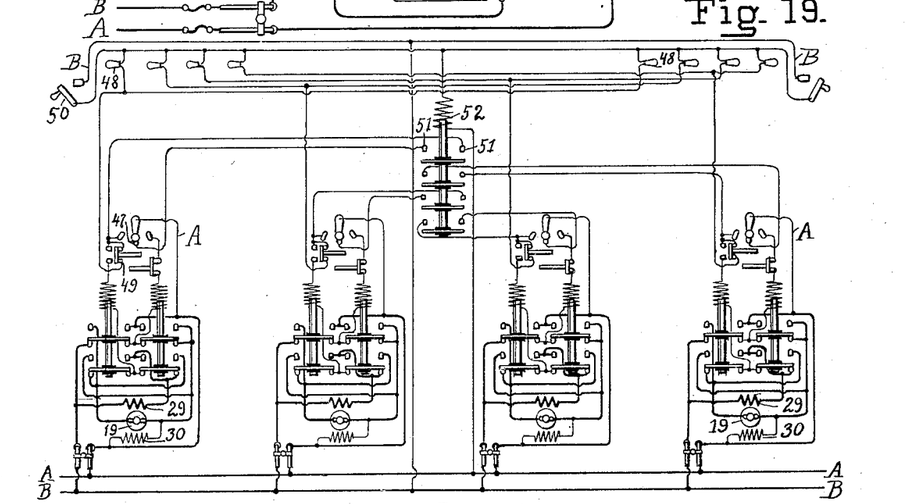
Fig. 19 is a diagrammatic representation of the system applied to operating a group of four doors, in which each door can be operated locally independently of all the other doors and in which all four of the doors, or so many as are not being operated individually and locally, can be operated from either one of two distant points with appropriate return-signals.

Fig. 19 shows a method of operating a set of four doors simultaneously by closing a single emergency-switch 50. The number of doors and the number of emergency-switches are not material, except that it is not desirable to operate enough doors simultaneously to give excessive drain upon the electrical power.

There is also provided a signal-lamp 48 for each door, which lights upon closure of the appropriate door and remains lighted until the emergency-switch is opened. The lamp can be relighted for inspection by reclosing the emergency-switch. Each local-door system is connected on the down side with a circuit-closer 51, one side of which is in series with the middle contact 47 of the local-control switch for that door and the other side of which is connected to the down side of the local-control switch. As in the system of Fig. 17 a door can be operated from the emergency-switches only when its local-control switch is closed on the middle contact. The circuit-closers 51 are separate and insulated from each other, but are mounted upon a single stem, which constitutes the plunger of a solenoid 52. This plunger and solenoid, with the contacts 51, form what will be called a "section-switch." The solenoid is connected in the circuit as follows: from the main A through the solenoid, through each of the emergency-switches in multiple, and thence back to the main B. When any emergency-switch is closed, all of the contacts of the section-switch will be closed and each of the door systems in which the local-control switch is on the middle point will be closed on the down side. The doors will then move until the emergency-switch is opened or a local-control switch is opened, or the lower-limit switch is opened as each door reaches the lower limit of its travel. At this latter point each lower-limit switch is opened at its relay-contacts and closed at its signal-contacts. The circuit for the signal-lamps is as follows: from the lead A through the middle contact 47 of the local-control switch, through the appropriate contact of the section-switch, thence through the signal-contacts 49 of the appropriate lower-limit switch, through the appropriate lamp, through the emergency-switch, and thence back to the main B. It will thus be seen that if the operator holds the emergency-switch closed long enough for all of the doors to close, he will get a signal at the appropriate lamp as each door closes. In this system, unlike that of Fig. 17, the lamp cannot light unless the emergency-switch is closed, nor can it light unless the section-switch is closed, except when the local-control switch also chances to be closed. There is thus a test of the emergency system. As each door system is entirely independent of the other door systems, each limit-switch operates to open its door system without interfering with any of the other door systems, and the signal-contacts of each limit-switch are so connected that the closure of a signal-circuit at any limit-switch does not interfere with any other part of the system. It thus appears that there are a set of doors and an electrical system for operating them, which includes independent door systems or circuits, each for controlling one of the doors, and an emergency system made up of one or more distant emergency-switches, and a common section-switch operated thereby for closing all of the local door-circuits on the down side, and means for giving a signal at the emergency-switches when each door closes, the signal being included in the emergency system and not in the door systems, together with a local-control switch for taking control and operating each door-circuit independently of the emergency switches or systems, without otherwise interfering with the emergency system.

Figures 3, 4:
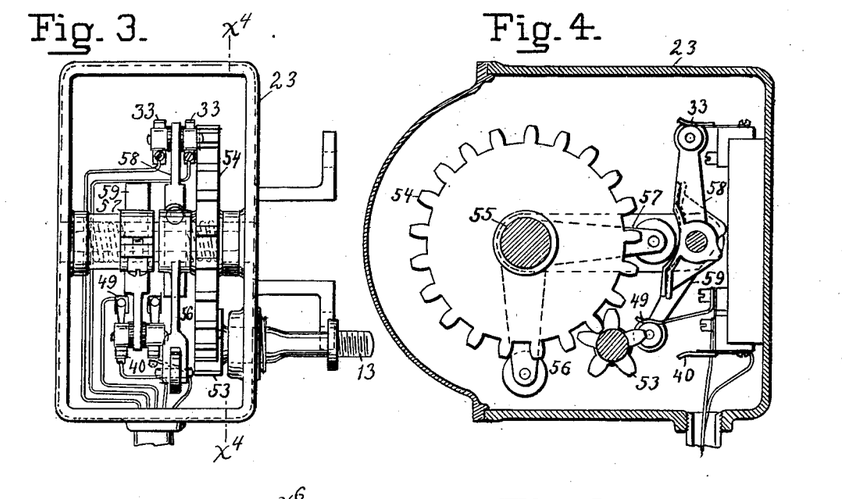
Fig. 3 is a top view of the limit-switch box with the cover removed.
Fig. 4 is a sectional view of the same on the line $x^4 x^4$ of Fig. 3.

The mechanism for closing and opening the limit-switches will now be described. It is illustrated in Figs. 3 and 4 in the position which it takes when the door is closed.

The limit-switches are operated by a spindle 13, provided with a screw end, whereby it may be coupled to shaft 10. This spindle passes through a stuffing-box in the side of the box 23, that incloses the limit-switch mechanism. On the end of the spindle inside the casing is a pinion 53, which meshes with a gear-wheel 54, mounted rigidly upon a shaft 55, upon which are also mounted two arms 56 57 at some suitable angle. On the ends of these arms are rollers to engage with and throw the switch-arms 58 59 of the limit-switches. These switch-arms and the arms for operating them are mounted in different vertical planes, so that one is operated by one of the arms and not by the other, and vice versa. The shaft 55 is revolved less than one revolution while the door is moved through its entire path or range of travel, and the arms are set on the shaft in such way that one of the arms 56 will engage with and throw the upper-limit switch-arm 58 when the door reaches the upper limit of its travel, and the other arm 57 will engage with the lower-limit switch-arm 59 when the door reaches the lower limit of its travel, each arm 56 59, as it moves away from such extreme position, closing or permitting the closure of its appropriate limit-switch.

Figure 5:
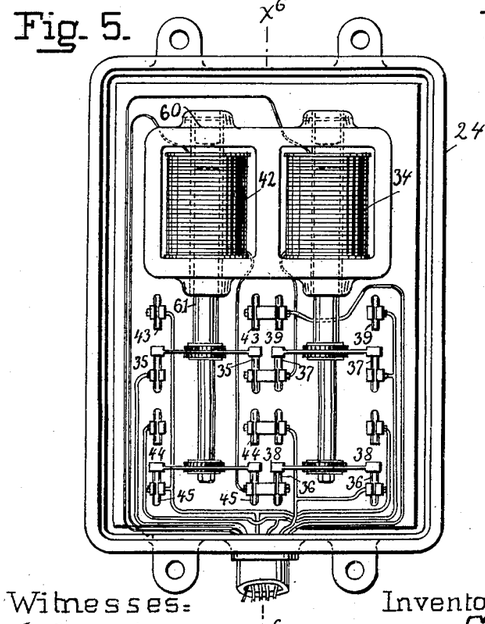
Fig. 5 is a front view showing the relays, the contacts which they control, and how these parts are mounted in their box.
Figure 6:
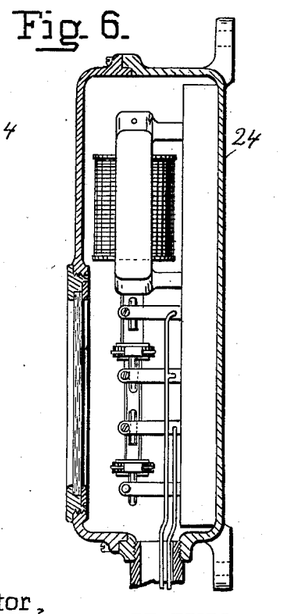
Fig. 6 is a sectional view on the line $x^6 x^6$ of Fig. 5.

The relays and the manner of mounting them are illustrated in Figs. 5 and 6. They are provided with iron-clad magnets. An iron core 60 projects downward, so as to increase the attraction for the plunger 61. Each plunger carries two contact-arms of spring sheet phosphor-bronze insulated from it, but rigidly fastened to it. The contact-studs carry adjustable carbon blocks, against which the contacts on the phosphor-bronze springs impinge. The box 24 in which these are inclosed has a removable glass window to provide for inspecting the contacts and for adjusting them.

Figures 7, 8, 9, 10:
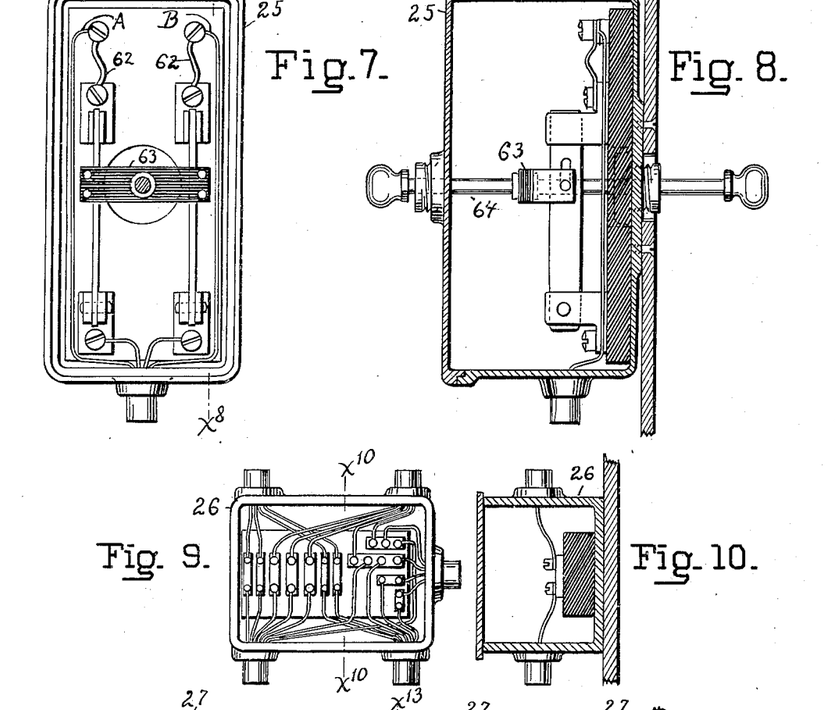
Fig. 7 is a top view of the main switch and fuses and the box in which they are mounted with the cover removed.
Fig. 8 is a sectional view of the same on the line $x^8 x^8$ of Fig. 7.
Fig. 9 is a front view of a junction-box with the cover removed.
Fig. 10 is a sectional view of the same on the line $x^{10} x^{10}$ of Fig. 9.
Figure 11:
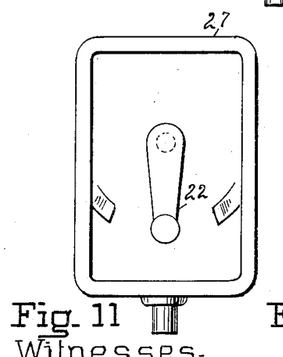
Fig. 11 is an outside view of the control-switch box.
Figure 12:
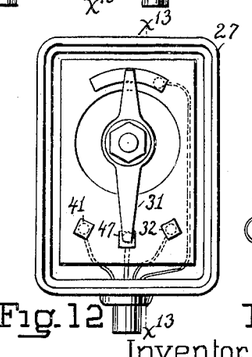
Fig. 12 is a front view of the same with the cover removed.
Figure 13:
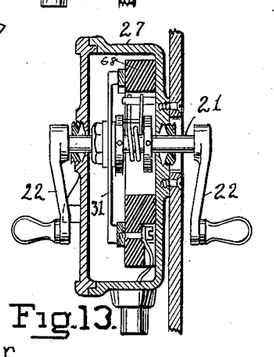
Fig. 13 is a sectional view of the same on the line $x^{13} x^{13}$ of Fig. 12.

The switch and fuses illustrated in Figs. 7 and 8 are contained in the water-tight box 25. The wires from the mains are led into the casing at the bottom and are attached to binding-posts near the top, mounted on a plate of insulating material. Thence the circuit is through fuses 62 to the double-pole knife-switch and through the switch and switch-hinges to the wires leading to the circuits for operating the door. The blades of the knife-switch are attached through hinge connections to a cross-bar 63 of insulating material. This bar is attached to a plunger-rod, one end of which passes through a stuffing-box in the cover of the box 25 and the other end of which passes through a stuffing-box in the back thereof to the other side of the bulkhead. By means of this rod the switch can be operated from either side of the bulkhead.

The wires from all of the other boxes are led to the junction-box 26, (illustrated in Figs. 9 and 10,) where the proper connections are effected. The conductors from the motor are led into the junction-box through a pipe at the right of the top. The conductors from the limit-switches are led in through a pipe at the left of the top. The connections from the circuit-closing relays and contacts which they control are led in through a pipe at the left of the bottom. The conductors from the local-control switch are led in through a pipe at the right of the bottom, and the conductors from the mains are led in through a pipe at the right side. In the junction-box is a plate of insulating material with metal strips attached thereto, and the wires are screwed to these strips to effect the connections. The points of connection of the wires in the junction-box are indicated in the diagram Fig. 18 by dots.

The local-control switch (illustrated in Figs. 11, 12, and 13) is provided with a plate of insulating material 68, on which the contacts are mounted. A switch shaft or spindle passes through stuffing-boxes on the top and bottom of the box 27 and carries a contact-finger 31, which is moved over the contacts by turning the spindle by the handles 22, mounted upon each end of the spindle. The end of the spindle which passes through the bottom of the box 27 also passes through the bulkhead, so that the switch can be operated from either side of the bulkhead. A spring is coiled around the spindle, and the ends of the spring lie on opposite sides of two pins, one of which is through collars on the spindle and the other of which is supported by the casing. The spring returns the switch, when released by the hand, to a definite position—viz., the middle position—thus automatically closing and holding the switch normally closed at contact 47, which is included in the circuits with the emergency-switches, through which the doors are operated electrically from the distant points of control.

Figures 14, 15:
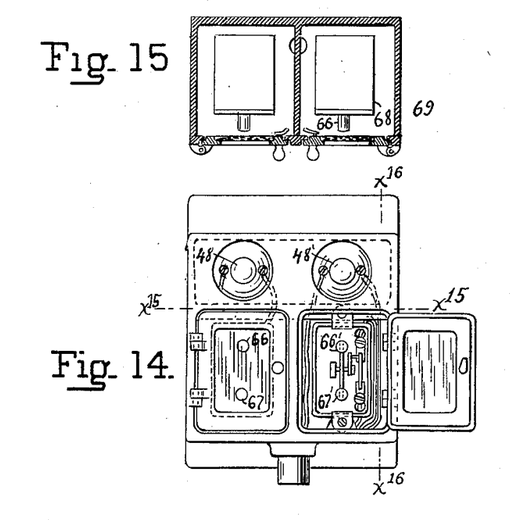
Fig. 14 is a front view of the emergency-switch with indicator, one door being open.
Fig. 15 is a top view of the same on the line $x^{15} x^{15}$ of Fig. 14.
Figure 16:
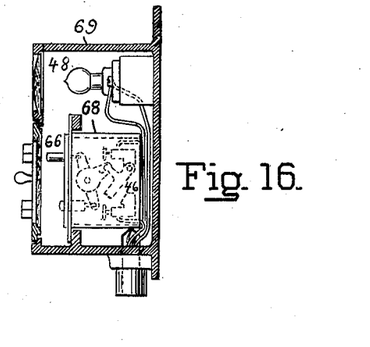
Fig. 16 is a side view of the same on the line $x^{16} x^{16}$ of Fig. 14.

The emergency-switches and signal-lamps (shown in the diagram Fig. 17) are illustrated in Figs. 14, 15, and 16. Each consists of a single-point switch with a push-button 66 to close it and another 67 to open it, such as is used in electric-lighting circuits, the switch being an ordinary snap-switch. It is mounted in a suitable porcelain box 68. The porcelain boxes for two switches are placed in a water-tight casing 69, in which is also placed the signal-lamps. Lamps might also be provided in circuit with the emergency-switches while the doors are being closed to indicate that the system is working.

It is obvious that many changes can be made without departing from the spirit of my invention.

Therefore what I claim, and desire to secure by Letters Patent of the United States, is—

1. The combination of a door, means for operating it electrically both locally and from a point at a distance from the door, and means at the door for taking control away from the distant point, substantially as described.

2. The combination of a door, means for operating it electrically both locally and from a point at a distance from the door, and means at the door for taking control away from the distant point in all positions of the door, substantially as described.

3. The combination of a door, means for operating it electrically from a distant point to close the door and locally to open or close it at will, and means at the door for taking control away from the distant point in all positions of the door, substantially as described.

4. The combination of a door, a switch located at the door for operating it electrically, and means located at a distant point for operating the door electrically through a contact controlled by the switch located at the door, substantially as described.

5. The combination of a door, a bulkhead in which the door is mounted, a switch located at the door, a handle on each side of the bulkhead for operating the switch, and means located at a distant point for operating the door electrically through a contact controlled by the switch located at the door, substantially as described.

6. The combination of a door, a switch located at the door for operating it electrically, means located at a distant point for operating the door electrically, through a contact controlled by the switch located at the door, and means for automatically closing this contact when the switch located at the door is released, substantially as described.

7. The combination of a door, a bulkhead in which the door is mounted, a switch located at the door, a handle on each side of the bulkhead for operating the switch, means located at a distant point for operating the door electrically through a contact controlled by the switch located at the door, and means for automatically closing this contact when the switch located at the door is released, substantially as described.

8. A system of doors, means for operating them locally and individually, means for operating a plurality of the doors together from one or more distant points, and means at the doors for taking away from the distant point or points the control of each of the doors individually, substantially as described.

9. The combination of doors, and an electrical system for operating them which includes an emergency system for operating the doors together and independent door systems for operating them individually, substantially as described.

10. The combination of doors, an electrical system for operating them which includes an emergency system for operating the doors together and independent door systems for operating them individually, and means at each door system for taking control thereof independently of the emergency system, substantially as described.

11. The combination of doors, an electrical system for operating them which includes an emergency system for operating the doors together and independent door systems for operating them individually, and means at each door system for taking control thereof independently of the emergency system without otherwise interfering with the emergency system, substantially as described.

12. A system of doors, means for operating them locally and individually, means for operating a plurality of the doors together from one or more distant points, means at the doors for taking away from the distant point or points the control of each of the doors individually, and a signal at the distant point or points to show the operation of each door individually, substantially as described.

13. The combination of a door or doors, means for operating them electrically from one or more distant points, suitable circuits, and a signal at the distant point or points to show the operation of each door, substantially as described.

14. The combination of a set of doors, an electrical system for operating them, including an emergency system for operating the doors together and independent door systems for operating them individually, and signals which are included in the emergency system and are not included in the independent door systems, substantially as described.

15. The combination of a door or doors, means for electrical operation thereof, a lower-limit switch for each door which is opened when the door is closed and is closed as soon as the door starts to open, an emergency switch or switches, for operating the door or doors from one or more distant points, and a signal at each emergency-switch which, on closure of each door, is operated through the lower-limit switch thereof, substantially as described.

16. The combination of a door or doors, means for electrical operation thereof, a shaft for driving each of the doors, means for operating the door or doors from one or more distant points, a signal at the distant point or points, and contacts operated by said shaft as each door is closed for operating said signal, substantially as described.

17. The combination of a set of doors, means for operating them simultaneously from a single switch, and limit-switches for opening the circuit for each door as it closes, without interfering with the other doors, substantially as described.

18. The combination of a set of doors, means for operating them simultaneously from a single switch, return-signals, and limit-switches for operating the proper signal and opening the circuit for each door as it closes, without interfering with the other doors, substantially as described.

19. The combination of a door, a compound-wound motor for operating it, an operating-circuit, means for opening and closing the door, and means for connecting both coils while the door is closing and only the series coil while the door is opening, substantially as described.

20. The combination of a switch provided with suitable contacts, a bulkhead, a box mounted on the bulkhead and inclosing the contacts, a spindle for operating the switch which passes through the box and bulkhead, and a handle on each end of the spindle, substantially as described.

21. The combination of a switch-shaft, a handle mounted on each end thereof, suitable contacts, and a spring for holding the switch normally in a definite position, substantially as described.

22. The combination of a switch-shaft, a handle mounted on each end thereof, suitable contacts, and a spring for holding the switch normally closed at one of the contacts, substantially as described.

Signed by me in New York city, New York, this 19th day of December, 1899.

GEORGE H. HILL.

Witnesses:
   THOMAS EWING, Jr.,
   SAMUEL W. BALCH.